US010327969B2

(12) United States Patent
Galonska

(10) Patent No.: US 10,327,969 B2
(45) Date of Patent: Jun. 25, 2019

(54) MOBILE TRANSPORT DEVICE

(71) Applicant: FORD GLOBAL TECHNOLOGIES, LLC, Dearborn, MI (US)

(72) Inventor: Marc Galonska, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 264 days.

(21) Appl. No.: 15/359,684

(22) Filed: Nov. 23, 2016

(65) Prior Publication Data

US 2017/0151110 A1 Jun. 1, 2017

(30) Foreign Application Priority Data

Nov. 30, 2015 (DE) .................. 10 2015 223 735

(51) Int. Cl.
| B62D 51/06 | (2006.01) |
| B62D 57/032 | (2006.01) |
| A61G 5/06 | (2006.01) |
| A61G 5/04 | (2013.01) |
| B25J 13/08 | (2006.01) |
| A61G 3/00 | (2006.01) |

(52) U.S. Cl.
CPC ............. *A61G 5/061* (2013.01); *A61G 3/00* (2013.01); *A61G 5/04* (2013.01); *B25J 13/089* (2013.01); *B62D 57/032* (2013.01); *A61G 2203/22* (2013.01); *A61G 2203/36* (2013.01); *A61G 2203/42* (2013.01)

(58) Field of Classification Search
CPC ......... A61G 5/061; A61G 3/00; B62D 57/032
See application file for complete search history.

(56) References Cited

U.S. PATENT DOCUMENTS

| 5,513,716 A | 5/1996 | Kumar et al. |
| 6,328,120 B1 * | 12/2001 | Haussler ............... A61G 5/061 |
| | | 180/8.2 |
| 6,416,272 B1 | 7/2002 | Suehiro et al. |
| 6,484,068 B1 | 11/2002 | Yamamoto et al. |
| 7,734,375 B2 | 6/2010 | Buehler et al. |
| 8,632,113 B2 | 1/2014 | Mather et al. |
| 8,849,451 B2 | 9/2014 | Rizzi et al. |
| 8,914,151 B2 | 12/2014 | Hurst et al. |

(Continued)

FOREIGN PATENT DOCUMENTS

| CN | 1557668 A | 12/2004 |
| CN | 202668547 U | 1/2013 |

(Continued)

OTHER PUBLICATIONS

Big Dog—The First Advanced Rough-Terrain Robot, https://www.bostondynamics.com/bigclog, Feb. 13, 2018, pp. 1-3.

(Continued)

*Primary Examiner* — Tony H Winner
(74) *Attorney, Agent, or Firm* — Brooks Kushman P.C.; Gregory P. Brown

(57) ABSTRACT

A mobile transport device is provided which has leg-like mobility fittings and a useful surface. The useful surface is in particular a seat unit of a motor vehicle which can transport a person seated on the seat unit out of a motor vehicle to a destination by means of the leg-like mobility fittings and without any climbing.

20 Claims, 2 Drawing Sheets

(56) References Cited

U.S. PATENT DOCUMENTS

| | | | |
|---|---|---|---|
| 8,956,313 B2* | 2/2015 | Bryant | A47C 3/02 |
| | | | 297/260.2 |
| 9,283,949 B2* | 3/2016 | Saunders | B25J 3/04 |
| 9,381,961 B1* | 7/2016 | Kataoka | B62D 57/02 |
| 9,499,219 B1* | 11/2016 | Jackowski | B25J 9/1694 |
| 9,868,210 B1* | 1/2018 | Whitman | B62D 57/032 |
| 2002/0023787 A1* | 2/2002 | Kamen | A61G 5/04 |
| | | | 180/7.1 |
| 2006/0270851 A1* | 11/2006 | Cleugh | C07C 51/367 |
| | | | 544/353 |
| 2008/0101115 A1* | 5/2008 | Kim | G11C 11/404 |
| | | | 365/174 |
| 2008/0265821 A1* | 10/2008 | Theobald | B25J 5/005 |
| | | | 318/568.12 |
| 2010/0090638 A1* | 4/2010 | Saunders | B25J 9/144 |
| | | | 318/568.12 |
| 2012/0013102 A1 | 1/2012 | Gao | |
| 2012/0291873 A1 | 11/2012 | Potter et al. | |
| 2013/0184861 A1 | 7/2013 | Pratt et al. | |
| 2014/0035263 A1 | 2/2014 | Bancroft | |
| 2014/0326521 A1 | 11/2014 | Hacikadiroglu et al. | |
| 2018/0172121 A1* | 6/2018 | Potter | B25J 9/102 |

FOREIGN PATENT DOCUMENTS

| | | |
|---|---|---|
| CN | 103917406 A | 7/2014 |
| DE | 9301831 U1 | 6/1993 |
| DE | 60119462 T2 | 9/2006 |
| DE | 202009008144 U1 | 8/2009 |
| DE | 102011087253 A1 | 5/2013 |
| WO | 2010142277 A1 | 12/2010 |
| WO | 2015025038 A1 | 2/2015 |

OTHER PUBLICATIONS

German Search Report dated Jul. 13, 2016 for German Application No. 102015223735.4, 7 pgs.

http://www.youtube.com/watch?v=M8YjvHYbZ9w, "Introducing Spot", Boston Dynamics, Feb. 9, 2015, 3 pages.

https://www.bostondynamics.com/, "Boston Dynamics is changing your idea of what robots can do", 2018, 2 pages.

Chinese Office Action and English translation for Application No. 201611052424.8, dated May 5, 2019, 9 pages.

* cited by examiner

MOBILE TRANSPORT DEVICE

CROSS-REFERENCE TO RELATED APPLICATIONS

This application claims foreign priority benefits under 35 U.S.C. § 119(a)-(d) to DE 10 2015 223 735.4 filed Nov. 30, 2015, which is hereby incorporated by reference in its entirety.

TECHNICAL FIELD

The disclosure relates to a mobile transport device, which has leg-like mobility fittings and is particularly suitable for the transport of people.

BACKGROUND

There is a series of conventional, particularly wheelchair-based, apparatuses already existing for transporting persons of restricted mobility from motor vehicles. Wheelchairs are generally suitable for transporting for example mobility-impaired, injured or older persons. The movement of wheelchairs can thereby be possible by both personal assistants and also by the persons seated in the wheelchair as well as by means of a drive. Wheelchairs thus enable the mobility of disabled persons and their participation in daily living, but are always coming up against barriers, e.g. when overcoming steps, stairs or even when getting in or out of vehicles.

There is a series of devices that make it easier for individuals to move from a vehicle seat into a wheelchair and vice versa, for example by means of a sliding apparatus (US 2012/0013102 A1) or other wheel-based apparatuses (WO 2015/025038 A1). Furthermore vehicle seats can be moved so that they make it easier to get in and out (US 2012/0013102 A1). However these apparatuses require changing from a vehicle seat into a wheelchair. The object exists of enabling a person to move out of a vehicle and away from the vehicle to a destination without having to leave his seat.

SUMMARY

This object is solved by a mobile transport device having the features of claim 1. Further advantageous embodiments and configurations of the disclosure are apparent from the figures and the exemplary embodiments.

A first aspect of the disclosure relates to a mobile transport device comprising a seat unit, at least one leg-like mobility fitting having at least two parts connected to one another and movable relative to one another, at least one drive device, at least one sensor and at least one control device.

The device according to the disclosure is advantageous because it enables the autonomous transport of individuals who are restricted in their independent movement, and furthermore also of objects, even over stairs, steps and rough terrain. Leg-like mobility fittings are known as attachments to develop ambulating robots for all-terrain movement as rolling vehicles. Thus there are developments of four-legged robots which enable movement via hydraulic piston-cylinder units (US 2010/0090638).

It is particularly preferred if the seat unit of the device according to the disclosure is a chair-like seat unit of a motor vehicle. This, thus advantageously, enables the autonomous transport of a person out of a vehicle to a destination away from the vehicle. The person is thus mobile without having to climb out of the vehicle. The term vehicle embraces in the present disclosure in particular a motor vehicle.

It is furthermore preferred if the leg-like mobility fittings of the device according to the disclosure can be changed into a rest position parallel to a seat surface. The use is particularly advantageous within the scope of a vehicle seat since the leg-like mobility fittings are located in the rest position parallel to the vehicle floor, and the device can be fastened to the vehicle floor, e.g. by snap-fitting into a suitable device known to one skilled in the art, without the leg-like mobility fittings being in the way. The device can furthermore be combined with a sliding device which advantageously enables the device to be slid out from the vehicle into a position in which the leg-like mobility fittings can be brought out from the rest position, i.e. into a working position. The leg-like mobility fittings can however also be moved directly in the vehicle in order to move the device autonomously out from the vehicle. The term rest position then designates a position of the leg-like mobility fittings in which they do not support or move the useful surfaces. The term working position designates a position of the leg-like mobility fittings in which they support or move the device according to the disclosure.

It is furthermore preferred if the device according to the disclosure has at least one operating device, which is connected to the control unit. In other words, the control unit is connected to at least one operating device that is mounted on the device. The control elements advantageously enable the operation to be carried out by a person seated on the device, so that this person can actively control the removal of the device from a corresponding vehicle as well as the direction and speed of the device during the transportation. Alternatively, the device can also be operated by remote-control.

It is furthermore preferred if the control unit of the device is designed as an on-board control for maintaining the balance of the device. The control unit can then comprise a control unit that is designed, in particular, for maintaining balance. A further control unit can also be provided that is intended particularly or exclusively for maintaining balance. The on-board control then reacts autonomously to changes in balance through active counter-control, by way of example, by changing the position of the leg-like mobility fittings, without active control movement of a transported person.

An embodiment of the device according to the disclosure is particularly preferred wherein the device has at least four leg-like mobility fittings wherein the leg-like mobility fittings are movable independently of one another. Four leg-like mobility fittings enable a type of natural balance since it is adapted to the arrangement of four limbs frequently encountered in the animal world.

The leg-like mobility fittings of the device are preferably electrically driven. Likewise preferred, the leg-like mobility fittings of the device are hydraulically driven. It is known to the person skilled in the art which drive device and further devices are to be used for the functioning of the corresponding types of drive.

A second aspect of the disclosure relates to a motor vehicle having a mobile transport device according to the disclosure.

A third aspect of the disclosure relates to a method for moving with a mobile transport device according to the disclosure wherein instructions regarding a direction, a destination and/or a speed are imparted via the control unit to the leg-like mobility fittings, which convert the instructions into a coordinated sequence of movements for the purposeful movement of the transport device.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
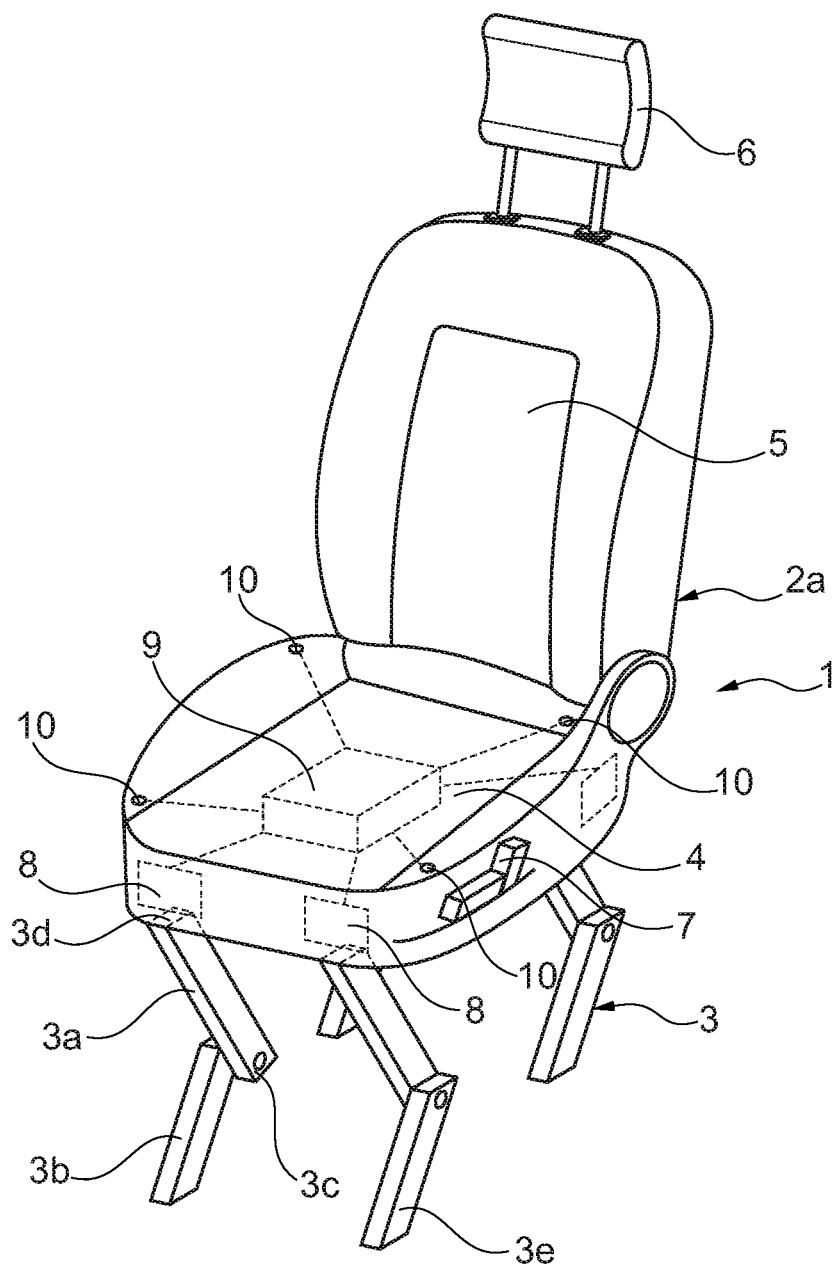
FIG. 1 shows an embodiment of a device according to the disclosure.

The illustration of FIG. 1 shows an embodiment of the disclosure, which has a mobile transport device 1 with a chair-like seat unit 2a, which is in particular a chair-like seat unit 2a of a motor vehicle. The device 1 has four leg-like mobility fittings 3.

The chair-like seat unit 2a has typical components of a chair, e.g. a seat surface 5, a head rest 6. Furthermore, operating devices 7 for operating or inputting commands for movement are arranged on the chair-like seat unit 2.

The leg-like mobility fittings 3 each have a first part 3a and a second part 3b, which are connected to one another by a hinge-like unit 3c. The part 3a is connected to the chair-like seat unit 2a by way of a similar hinge-like unit 3d. As an alternative to the illustrated two-part embodiment of the leg-like mobility fittings 3, these can also be sub-divided into even more parts, e.g. have three or four parts overall. The foot regions 3e of the leg-like mobility fittings 3 can also have expansions, which increase the stability of the device 1 when stationary and also when moving, as well as increase the all-terrain access by counteracting sinking into soft ground, for example.

The leg-like mobility fittings 3 can be driven in particular electrically, but also however, for example, hydraulically. The device 1 has at least one drive unit 8 for driving the leg-like mobility fittings 3. In FIG. 1, a drive device 8 is arranged in the chair-like seat unit 2 in the region of the connection 3d of the leg-like mobility fittings 3 to the chair-like seat unit 2, which directly enable the movement of the leg-like mobility fittings 3. Alternatively, a central drive device can also be arranged in or on the chair-like seat unit 2a.

The leg-like mobility fittings 3 are designed to move independently of one another. The movement of the leg-like mobility fittings 3 can also be undertaken in a coordinated manner. In order to coordinate the movements of the leg-like mobility fittings 3, a control unit 9 is provided, which is arranged in the region of the chair-like seat unit 2a, for example inside or underneath the seat surface 4.

The device 1, furthermore, has a row of sensors 10, which are likewise connected to the control unit 9. The sensors are designed in particular for detecting orientation and speed of the device 1. The sensors 10 may comprise, inter alia, a gyroscope, which may be used for the active position regulation of the device 1. The control unit 9 detects the sensor values and sends corresponding control commands to the drive device 8 in order to balance the device 1 by moving the leg-like mobility fittings 3. The control unit 9 comprises a sub-unit designed for balancing the device 1. Alternatively, a separate second control unit can be provided (not shown), which is provided solely for balancing the device 1.

Using the operating devices 7, a person seated on the seat surface 4 can impart manual control commands that are processed by the control unit 9 and forwarded to the leg-like mobility fittings 3. The control unit 9 can also be connected by a wireless communication to a remote control device through which the control commands can be imparted to the device 1.

The leg-like mobility fittings 3 are designed so that they can be collapsed and brought into a rest position underneath the chair-like seat unit 2a. If the leg-like mobility fittings 3 are in a rest position underneath the chair-like seat unit 2a, the parts 3a and 3b are located substantially parallel to the floor and to the seat surface 4 of the chair-like seat unit 2a.

The device 1 is designed to be moved into or out of the vehicle on the basis of corresponding control commands. In the ideal case, the device 1 is moved into or out of the vehicle with a person sitting on the seat surface 4. In order to exit the vehicle, the leg-like mobility fittings 3 are moved out of the rest position in a coordinated sequence of movements controlled by the control unit 9 so that they lift up or raise the chair-like seat unit 2a, and the device 1 is moved out from the vehicle by a coordinated movement of the leg-like mobility fittings 3. In other words, the movement of the device 1 can be pre-set so that the device 1 "runs" from the vehicle. If the device 1 is fixed by means of a mechanism for engaging in the vehicle, then where necessary a horizontally acting force has to be exerted on the part of the device 1 or the vehicle in order to move the device out from an engaged position.

Alternatively, the device 1 can be combined with a sliding unit. The device 1 can slide by means of the sliding unit at least partially out of the vehicle (or into same) before the leg-like mobility fittings 3 come into operation. Thus, secondary means can be used, for example units which support the device 1, before the leg-like mobility fittings 3 are fully in a working position. The term sliding unit embraces means that enable, for example, wheeling, particularly in combination with rails. It is here clear to the person skilled in the art how corresponding units function or are to be configured.

The device 1 can furthermore be movable in its circumferential direction relative to the vehicle floor so that it can be turned at least in part. The device 1 can thus be turned into a suitable position in the direction of a vehicle door for getting out so that the device 1 can be moved more easily out of (or into) the vehicle. It is clear to the person skilled in the art how corresponding units function or are to be configured.

In order to move the device 1 into the vehicle, the device is controlled so that it basically "runs" into the vehicle. At the place where the seat is to be locked, the leg-like mobility fittings 3 are moved in a coordinated sequence of movements controlled by the control unit 9 so that the chair-like seat unit 2a is let down onto the floor of the vehicle, wherein the device 1 is moved through a coordinated movement of the leg-like mobility fittings 3. For this, a horizontally acting force is to be exerted when necessary on the part of the device 1 or the vehicle in order to engage the device 1 in a corresponding unit. In other words, the movement of the device 1 can be pre-set so that the device 1 "runs" and is "let down" into the vehicle. The sliding units or turning units mentioned above can likewise be used when moving into the vehicle.

Figure 2:
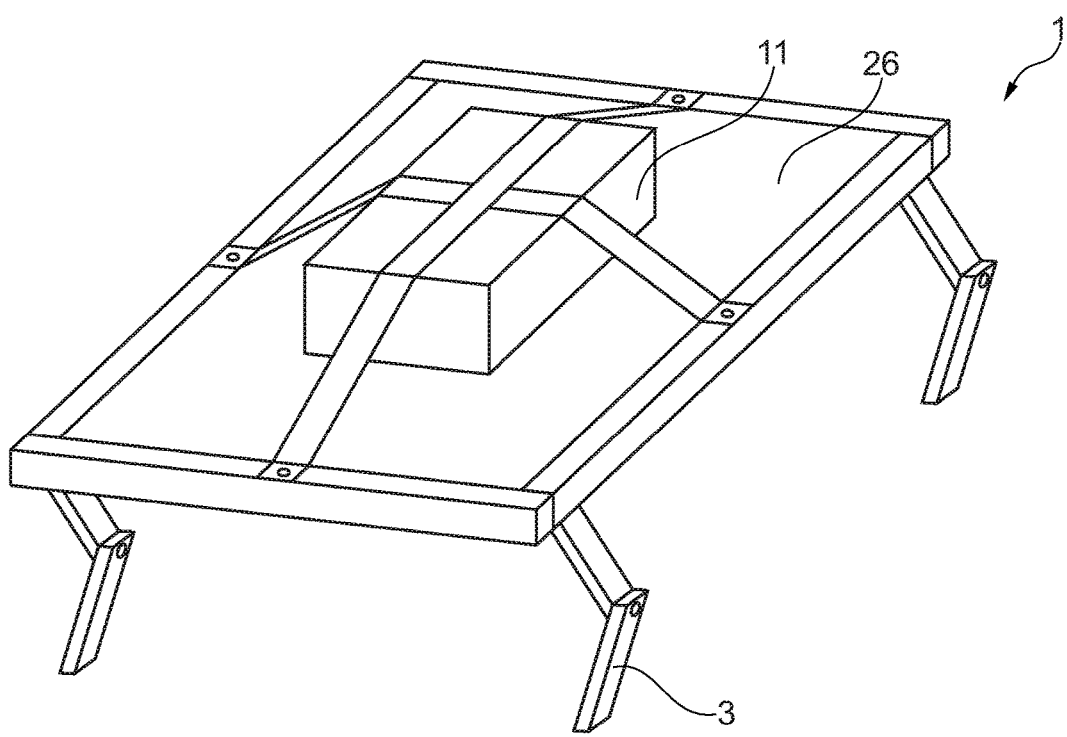
FIG. 2 shows a further embodiment of a device according to the disclosure.

In a further embodiment according to the illustration of FIG. 2, the useful surface 2 of the device 1 has no seat unit but a loading surface 2b. Also in this embodiment, the device 1 has the features described above of a control unit, drive devices and sensors. The loading surface 2b is designed to be flat. The loading surface 2b is provided to transport a payload. The device 1 can have means in order to fasten a payload on the loading surface, e.g. straps. The control of the device 1 with the loading surface 2b is by remote control. The device 1 according to FIG. 2 is to be conveniently housed since it can be stowed, for example, on the rear shelf of a vehicle, the rear bench or in the trunk space and can be stored there by folding in the leg-like mobility fittings 3. When necessary the leg-like mobility fittings 3 are controlled so that the device 1 is raised and brought to a position where a payload 11 is to be arranged on the loading surface 2b.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A mobile transport device comprising:
   a seat unit;
   a leg mobility fitting with first and second parts connected and movable relative to one another, the first part connected to the seat unit;
   a drive device connected to the first part and the seat unit to drive the leg mobility fitting;
   a sensor configured to detect an orientation and speed of the drive device; and
   a control unit configured to, in response to signals from the sensor, move the leg mobility fitting, via the drive device, to balance the seat unit.

2. The device as claimed in claim 1, wherein the seat unit is a chair seat unit of a motor vehicle.

3. The device as claimed in claim 1, wherein the leg mobility fitting has a rest position with the first and second parts extending parallel to a seat surface.

4. The device as claimed in claim 1 further comprising an operating device configured to impart commands to the control unit to control operation of the leg mobility fitting.

5. The device as claimed in claim 1, wherein the control unit is further configured to balance the seat unit autonomously.

6. The device as claimed in claim 1, wherein the leg mobility fitting includes four leg mobility fittings.

7. The device as claimed in claim 6, wherein each of the four leg mobility fittings are movable independently of each other.

8. The device as claimed in claim 1, wherein the drive device is an electric drive device to electrically drive the leg mobility fitting.

9. The device as claimed in claim 1, wherein the drive device is a hydraulic drive device to hydraulically drive the leg mobility fitting.

10. A vehicle comprising:
    a seat including a leg having a first part connected to the seat and a second part connected and moveable relative to the first part;
    a drive device connected to the seat and the first part to move the leg, and including a sensor; and
    a controller configured to, in response to orientation and speed signals from the sensor, move the leg, via the drive device, to balance the seat.

11. The vehicle of claim 10, wherein the orientation and speed signals include instructions regarding a direction, a destination and a speed of the leg.

12. The vehicle of claim 11, wherein the instructions allow the controller to move the leg using a coordinated sequence of movements.

13. The vehicle of claim 10, wherein the leg has a rest position underneath the seat with the first and second parts are extending parallel to and between a floor and a surface of the seat.

14. The vehicle of claim 10, wherein the first and second parts of the leg are connected via a hinge.

15. The vehicle of claim 10, wherein the sensor is a gyroscope.

16. A method of controlling a mobile transportation device for use with a motor vehicle, the method comprising:
    in response to instructions, via a sensor associated with a leg having first and second parts and moveably connected to a seat, regarding a direction, a destination and a speed of the leg, controlling movement of the first and second parts of the leg, via a control unit, using a coordinated sequence of movements to balance the seat.

17. The method of claim 16 further comprising in response to instructions, via a second sensor associated with a second leg having third and fourth parts and moveably connected to the seat, regarding a direction, a destination and a speed of the second leg, control movement of the third and fourth parts of the second leg using a second coordinated sequence of movements to balance the seat.

18. The method of claim 16 further comprising in response to receiving a control command to move the mobile transportation device out of the motor vehicle, controlling movement of the first and second parts of the leg, via the control unit, to lift the mobile transportation device from a rest position to a working position, wherein the first and second parts of the leg extending parallel to a floor of the motor vehicle and beneath the seat in the rest position, and wherein the first and second parts of the leg supporting the seat for movement relative to the floor in the working position.

19. The method of claim 18 wherein the control command is a user input to an operating device in communication with the control unit, the user input providing an instruction to remove the mobile transportation device from the motor vehicle.

20. The method of claim 18 further comprising, in response to being at a place where the mobile transportation device is to be locked into the motor vehicle, controlling movement of the first and second parts of the leg, via the control unit, to let down the mobile transportation device from the working position to the rest position.

* * * * *